April 1, 1924.  1,489,093
R. D. MERSHON ET AL
WELDING ALUMINUM
Filed Dec. 8, 1919
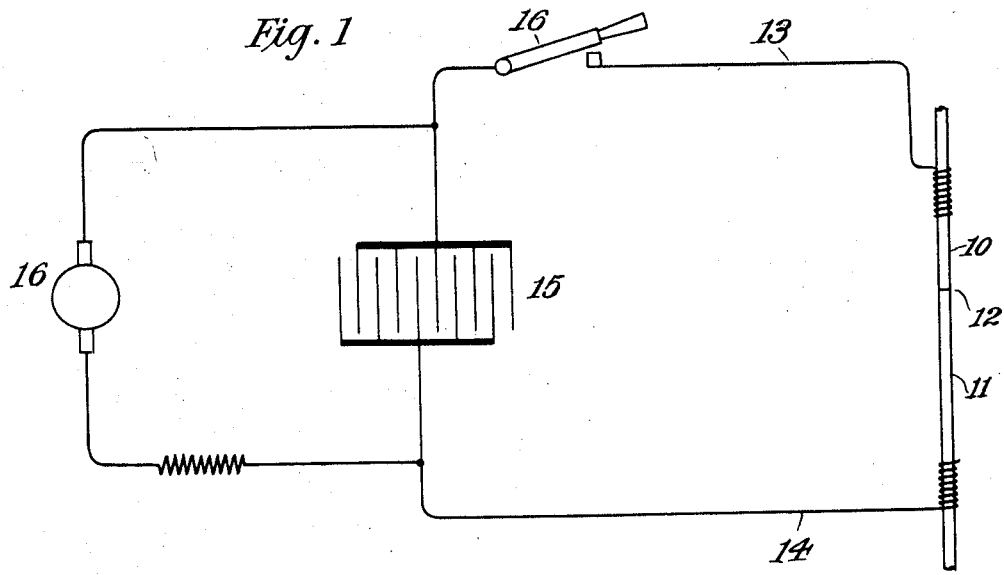
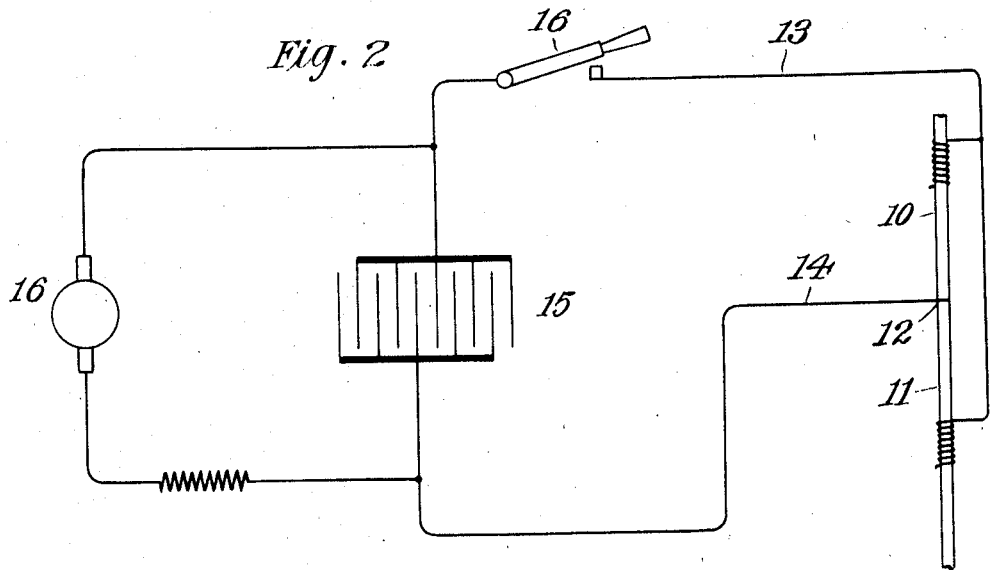
Inventors:
Ralph D. Mershon
and Percy A. Ross,
by their Attorneys
Kerr, Page, Cooper & Hayward Patented Apr. 1, 1924.

1,489,093

UNITED STATES PATENT OFFICE.

RALPH D. MERSHON, OF NEW YORK, N. Y., AND PERCY A. ROSS, OF NORWALK, CONNECTICUT; SAID ROSS ASSIGNOR TO SAID MERSHON.

WELDING ALUMINUM.

Application filed December 8, 1919. Serial No. 343,266.

*To all whom it may concern:*

Be it known that we, RALPH D. MERSHON and PERCY A. ROSS, both citizens of the United States, residing at New York, county and State of New York, and Norwalk, county of Fairfield, and State of Connecticut, respectively, have invented certain new and useful Improvements in Welding Aluminum, of which the following is a full, clear, and exact description.

In prior methods for electric welding of aluminum to aluminum or to other metals it has been believed necessary that the parts to be joined be brought together by percussive engagement; or that a terminal of the source of welding current (say a charged condenser) be brought into contact with the parts at the point where the weld is to be made so that the welding current will flow between the parts and the terminal at the instant of contact. Our present invention is based on the discovery that percussive engagement of the parts, or bringing the welding terminal into contact with the joint at the instant of discharge of the condenser, is unnecessary, and that on the contrary the parts can be arranged in the desired positions and in contact with each other before the condenser is discharged.

Referring to the accompanying drawing, Fig. 1 is a diagram illustrating the preferred way of practising our invention.

Fig. 2 is a diagram illustrating another form of the invention.

Referring to Fig. 1, 10, 11 are intended to represent any two parts (one or both composed of aluminum) which are to be welded together, as for example two wires which it is desired to join end to end. For this purpose the wires or other parts are shaped to fit nicely at the points where they are to be joined and are placed one against the other in the desired position. If necessary they are held in such position by a suitable insulating clamp or by any other convenient means, not shown. The two parts are also connected electrically to the terminals 13, 14, of the source of welding current, for example a condenser 15 charged by a generator 16. The connections to the terminals mentioned should be so made as to make the resistance thereat practically nil, as for example by wrapping the wires tightly together, or by clamping them firmly.

One terminal of the condenser is provided with a switch 16. When the connections referred to above have been made, the switch is closed, whereupon the condenser discharges across the joint 12. The sudden rush of current through this point of relatively poor conductivity produces an instantaneous rise of temperature sufficient to fuse together the contacting surfaces of the parts.

Another way of practising the invention is illustrated in Fig. 2. In this case only one terminal of the condenser is connected to the parts 10, 11, which are to be welded, and the other terminal is simply laid or held on the joint, 12, where the weld is to be made. The switch 16 is then closed. The discharge then takes place between the contacting terminal and the two parts 10, 12, at the point where they touch, with the result that the latter are fused together. It sometimes happens that the welding terminal is itself welded to one or both the other parts, in which case it is simply cut or pulled off after the weld is made.

It is to be understood that the invention is not limited to the specific details herein described but may be practised in other ways without departure from its spirit.

We claim:

1. The method of welding aluminum, comprising arranging the parts in contact in the position in which they are to be welded and directly connecting the same in open circuit with both terminals of a charged condenser; and after the parts have been so arranged closing the circuit, whereby the condenser discharges at the joint between the parts and fuses them together at such point.

2. The method of welding aluminum, comprising arranging the parts in contact with each other in the position in which they are to be welded and directly connecting the parts with a charged condenser in open circuit, one part to one terminal of the condenser and the other part to the other terminal; and after the parts have been so arranged closing the circuit, whereby the condenser discharges through the joint between the parts and fuses them together at such point.

3. The method of welding metal parts, comprising first arranging the parts in contact with each other in the position in which they are to be welded, connecting the parts directly with a source of stored electrical energy, and thereafter discharging such stored electrical energy through the point of contact to cause a momentary current of relatively high value to flow through such point and fuse the parts together thereat.

In testimony whereof we hereunto affix our signatures.

RALPH D. MERSHON.
PERCY A. ROSS.